United States Patent [19]

May et al.

[11] Patent Number: 4,680,672
[45] Date of Patent: Jul. 14, 1987

[54] MOLDED CASE CIRCUIT BREAKER WITH FRONT ACCESSIBLE CONTROL PANEL

[75] Inventors: William E. May, Lawrenceville; Rex McColloch, Jr., Snellville; William A. King, Lithonia, all of Ga.

[73] Assignee: Siemens-Allis, Atlanta, Ga.

[21] Appl. No.: 796,542

[22] Filed: Nov. 8, 1985

[51] Int. Cl.⁴ .............................................. H02B 1/04
[52] U.S. Cl. ..................................... 361/353; 361/426
[58] Field of Search ................. 361/353, 426; 200/294, 200/296; 335/6, 18; 339/17 C, 17 LC

[56] References Cited

U.S. PATENT DOCUMENTS

| | | | |
|---|---|---|---|
| 3,761,776 | 9/1973 | Willard | 361/57 |
| 3,761,777 | 9/1973 | Willard et al. | 361/96 |
| 3,761,778 | 9/1973 | Willard | 361/54 |
| 4,300,110 | 11/1981 | Bayer et al. | 200/50 B X |
| 4,542,441 | 9/1985 | Perretta | 361/412 |
| 4,570,338 | 2/1986 | Ignatowicz | 339/17 C |

OTHER PUBLICATIONS

Stab-Lock, catalog No. 1-125R, FPE, "The Bold New Look of Leadership", p. 6, Oct. 1958.

Primary Examiner—A. D. Pellinen
Assistant Examiner—Morris Ginsburg
Attorney, Agent, or Firm—Volker R. Ulbrich; John James

[57] ABSTRACT

A molded case circuit breaker has control terminals mounted on the front of the breaker and accessible from the front. A transparent plexiglass cover is positioned over the terminals to prevent inadvertent contact with the terminals and an opening is provided in the side of the casing for the egress of the control wires. With the control terminals on the front of the circuit breaker, an inspection can be performed without disconnecting power from the breaker.

11 Claims, 3 Drawing Figures

4,680,672

MOLDED CASE CIRCUIT BREAKER WITH FRONT ACCESSIBLE CONTROL PANEL

BACKGROUND OF THE INVENTION

This invention relates to molded case circuit breakers and more particularly to a solid state molded case circuit breaker which has control terminals.

Circuit breakers are designed to interrupt the flow of electric current in a circuit under certain preselected conditions. For example, the circuit breaker may open the circuit if the current magnitude becomes too high, the voltage becomes too low or one phase of a multiphase circuit carries more current than another phase of the circuit. In addition to these functions, the circuit breaker may be called upon to perform other functions which it must be wired to accomplish. These functions can be accomplished by the use of control wiring which attaches to the control terminals on the circuit breaker. Thus, the circuit breaker control terminals might include terminals for receiving 120 volt AC control voltage. The terminals might also include test terminals which can be operated to test the operation of the breaker. The terminals may also provide for connection to an external transformer for ground fault sensing or may have terminals available which perform switching functions under certain conditions for sounding alarms or other auxiliary functions. Thus, it can be appreciated that the control functions of the circuit breaker are indeed important and useful functions which are facilitated by the use of control terminals.

Typically, circuit breakers have provided the control terminals either on the rear of the molded casing or on the side of the molded casing. When the control terminals are located on the rear of the circuit breaker casing, the installed circuit breaker has to be removed before a connection can be established or a change can be made in the control circuits. This requires removing the circuit breaker from the panel and disconnecting power to the breaker.

Similarly, when the control terminals are located on the side of the circuit breaker housing and the circuit breaker is installed in a control panel as is typical, the terminals are inaccessible. To change the wiring, the breaker must be removed from the panelboard, which entails interrupting power at least from the circuit breaker. While the wiring is being checked or changed, the circuit breaker is out of service, which may cause equipment down time in an industrial or manufacturing operation. Since downtime of equipment ordinarily idles many workers, downtime is quite expensive and is an item which must be minimized. Accordingly, it will be appreciated that it will be highly desirable to provide a circuit breaker which has terminals which are accessible for adding or changing wiring without having to remove the circuit breaker from the panel while the changes are made.

Accordingly, it is an object of the present invention to provide a molded case circuit breaker which has control terminals.

Another object of the present invention is to provide a molded case circuit breaker which has terminals which are easily accessible.

Another object of the present invention is to provide terminals which are easily accessible for inspection without removing the circuit breaker from the panelboard.

SUMMARY OF THE INVENTION

Briefly stated, in accordance with one aspect of the invention, the foregoing objects are achieved by providing a molded case circuit breaker which has a molded case with a front and a front portion. The front portion defines an opening, first and second grooves adjacent opposed boundaries of the opening and a side portion with an opening adjacent the front portion opening between the first and second grooves. A circuit board is positioned in the first and second grooves on the interior of the case. A terminal is mounted on the circuit board and is accessible from the front.

By having the terminal accessible from the front of the molded case circuit breaker, wiring changes can be made without removing the circuit breaker from the panel. This means that less time will be required to make wiring modifications and changes with the terminals on the front of the circuit breaker. By mounting the terminals on the front of the circuit breaker, downtime of equipment is minimized. The terminals are available for inspection without disruption of the power to the circuit breaker.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENTS

Figure 1:
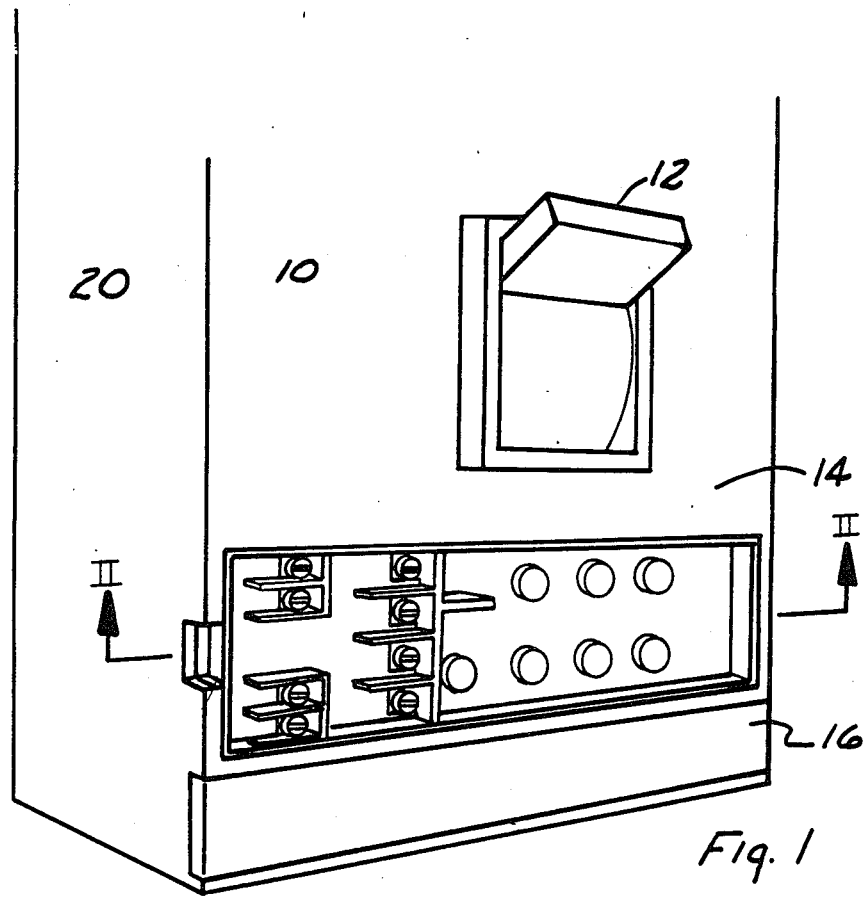
FIG. 1 is a diagrammatic isometric view of a molded case circuit breaker incorporating the present invention.
Figure 2:
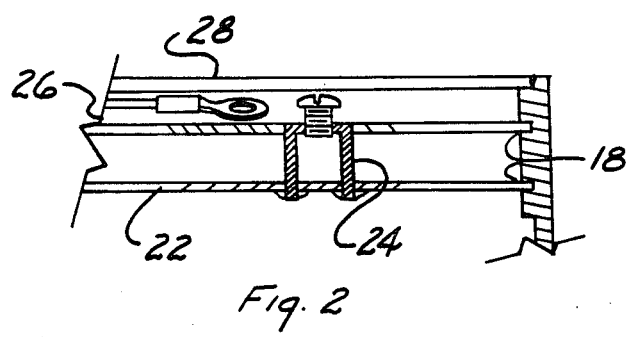
FIG. 2 is a diagrammatic view of a fragmented section segment taken along line II-II of FIG. 1 illustrating the relationship between the circuit board, terminal and transparent plastic.

Referring to FIGS. 1 and 2, a molded case circuit breaker 10 has a handle 12 mounted on the front of the circuit breaker 10 for turning the circuit breaker 10 on and off. The circuit breaker 10 has a molded case which has a front face 14 and a front portion 16 which defines an opening. As illustrated in FIG. 1, the front portion opening is rectangular in configuration, but could be a configuration other than rectangular. The front portion 16 also defines a series of grooves 18 which are positioned adjacent opposed boundaries of the front portion opening. Preferably, there are three sets of grooves 18 with grooves in each set being parallel to one another.

The molded case also has a side portion 20 which has an opening therein adjacent the opening of the front portion 16. The front and side openings are located such that the side opening is aligned with the front opening.

Referring to FIG. 2, a circuit board 22 is positioned in the first and second grooves on the interior of the circuit breaker. A terminal 24 is connected to the circuit board 22 and is accessible from the front of the circuit breaker. The terminals 24 is preferably an inverted U-shaped terminal with the legs of the U mechanically attached to the circuit board. Preferably, the legs of the U are soldered in place to make a firm connection. The terminal extends from the circuit board toward the front of the circuit breaker.

A top plate 26 is positioned in the third and fourth grooves parallel to, and spaced from, the circuit board 22. The top plate 26 is preferably a molded part which has an opening therein for receiving the terminal 24. The terminal 24 is preferably a screw type terminal with a screw extending beyond the top plate toward the front of the circuit breaker so that it is accessible for attaching wires to the terminal.

A cover plate 28 is positioned in the fifth and sixth grooves, parallel to and spaced from the top plate 26 and the circuit board 22. The cover is preferably formed of transparent plastic through which the terminals 24 are visible when the cover is in place. Preferably, the plastic cover engages the fifth and sixth grooves in such a manner that the plastic cover 28 snaps into position. Having the cover snap in position allows placement of the terminals at any convenient location on the front of the breaker.

In the preferred embodiment illustrated in FIG. 2, there are eight terminals which are arranged in three groups. The first group consists of four terminals which are located toward the center of the circuit breaker along the inner periphery of the front opening and positioned one above the other in a vertical line. The remaining four terminals are arranged in two groups of two terminals each located adjacent the outer periphery of the front opening and arranged in a vertical line with the center of the line of terminal being open to provide a gap for wires to pass through. Wires entering through the side opening can easily pass between the groups of two terminals for ready access to the four terminals arranged in a vertical line. This is a direct route for the wires.

Figure 3:
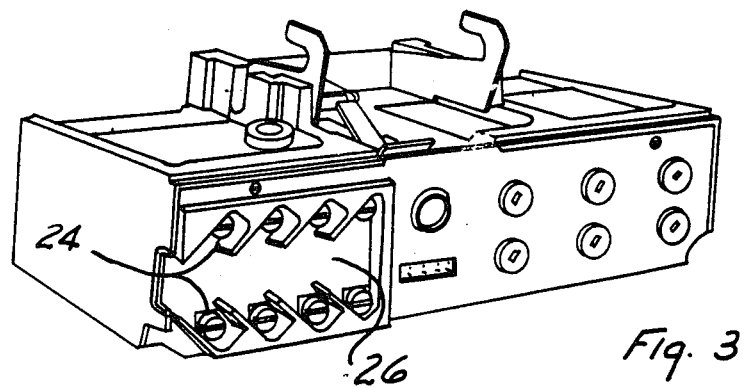
FIG. 3 illustrates an alternate arrangement of the terminals.

Referring to FIG. 3, the terminals are arranged in two horizontal rows with four terminals in each row. This arrangement provides ample space between the rows for the control wiring which enters through the side opening. The horizontal arrangement of terminals also provides a direct route for the wires while presenting a neat, compact appearance.

After mounting the molded case circuit breaker in the panelboard or other environment, the control wiring is added by properly stripping and lugging the control wire conductors with ring terminals which are secured by the screws of the terminal. The transparent cover is removed to provide access to the control wire terminals. The lugged wires are attached to the appropriate terminals with the screw. After all necessary wires are added, the plastic cover is reinstalled which prevents inadvertent contact with the terminals.

Each terminal is an inverted U-shape which is mechanically attached and soldered to the trip unit printed circuit board. This establishes direct electrical connection from the wire ring terminal to the ciricuit board. The screw of the terminal penetrates the molded top plate of the circuit breaker for attachment of the wire ring terminal. The molded top plate also contains molded barriers which provide electrical isolation between the various terminals. This close tolerance penetration of the molded top plate also provides for ample strain relief which resists pulling forces on the control wires. The side opening provides egress for the control wires.

It will now be understood that there has been disclosed an improved molded case circuit breaker which has easily accessible terminals. The circuit breaker provides a means where control wiring connections can be conveniently made and where those same connections are available for inspection without disruption of the power connections to the circuit breaker.

As will be evident from the foregoing description, certain aspects of the invention are not limited to the particular details of the examples illustrated, and it is therefore contemplated that other modification or applications will occur to those skilled in the art. It accordingly intended that the claims shall cover all such modifications and applications as do not depart from the true spirit and script of the invention.

What is claimed as new and desired to be secured by Letters Patent of the United States is:

1. A molded case circuit breaker, comprising:
    a molded case having a front, a front portion defining an opening, first and second grooves adjacent opposed boundaries of the front portion opening and a side portion with an opening adjacent the front portion opening;
    a circuit board positioned in said first and second grooves on the interior of the molded case; and
    a terminal mounted on the circuit board and accessible from the front.

2. A molded case circuit breaker according to claim 1, including third and fourth grooves and a top plate positioned in the third and fourth grooves.

3. A molded case circuit breaker according to claim 2, wherein the terminal is a screw terminal with a terminal screw protruding beyond the top plate.

4. A molded case circuit breaker according to claim 1, wherein the terminal is an inverted U-shaped terminal with the legs of the U mechanically attached to the circuit board.

5. A molded case circuit breaker according to claim 4, wherein the legs of the U-shaped terminal are soldered to the circuit board.

6. A molded case circuit breaker according to claim 2, including fifth and sixth grooves and a cover plate positioned in the fifth and sixth grooves.

7. A molded case circuit breaker according to claim 6, wherein the cover plate is transparent.

8. A molded case circuit breaker according to claim 1, wherein there are eight terminals arranged in first and second groups of four terminals each, said first group having four equally spaced terminals along the inner periphery of the front portion opening arranged in a vertical line, said second group of four terminals being divided into two groups of two terminals with a space between the groups for the passing of conductors from the side portion opening to the first group of four terminals.

9. A molded case circuit breaker according to claim 1, comprising a plurality of terminals arranged in vertical rows.

10. A molded case circuit breaker according to claim 1, comprising a plurality of terminals arranged in horizontal rows.

11. A molded case circuit breaker according to claim 1, wherein there are eight terminals arranged in two horizontal rows of four terminals.

* * * * *